(12) United States Patent
Tabarovsky et al.

(10) Patent No.: US 6,636,045 B2
(45) Date of Patent: Oct. 21, 2003

(54) METHOD OF DETERMINING FORMATION ANISOTROPY IN DEVIATED WELLS USING SEPARATION OF INDUCTION MODE

(75) Inventors: Leonty A. Tabarovsky, Houston, TX (US); Mikhail Epov, Novosibirsk (RU); Michael B. Rabinovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/072,173

(22) Filed: Feb. 7, 2002

(65) Prior Publication Data

US 2002/0186013 A1 Dec. 12, 2002

Related U.S. Application Data

(63) Continuation-in-part of application No. 09/825,104, filed on Apr. 3, 2001.
(60) Provisional application No. 60/312,655, filed on Aug. 15, 2001.

(51) Int. Cl.[7] .................................................. G01V 3/18
(52) U.S. Cl. ........................................... 324/343; 702/7
(58) Field of Search ................................ 324/338–343; 702/6, 7, 9

(56) References Cited

U.S. PATENT DOCUMENTS

| | | | |
|---|---|---|---|
| 5,329,448 A | 7/1994 | Rosthal | 364/422 |
| 5,656,930 A | 8/1997 | Hagiwara | 324/339 |
| 5,666,057 A | 9/1997 | Beard et al. | 324/339 |
| 5,703,773 A | 12/1997 | Tabarovsky et al. | 364/422 |
| 5,757,191 A * | 5/1998 | Gianzero | 324/339 |
| 5,781,436 A | 7/1998 | Forgang et al. | 364/422 |
| 5,884,227 A | 3/1999 | Rabinovich et al. | 702/7 |
| 5,999,883 A | 12/1999 | Gupta et al. | 702/7 |
| 6,092,024 A | 7/2000 | Wu | 702/7 |
| 6,147,496 A | 11/2000 | Strack et al. | 324/343 |
| 6,466,872 B1 * | 10/2002 | Kriegshauser et al. | 702/7 |
| 6,502,036 B2 * | 12/2002 | Zhang et al. | 702/7 |
| 2003/0055565 A1 | 3/2003 | Omeragic | |

OTHER PUBLICATIONS

J. H. Moran et al.; *Effects of formation anisotropy on resistivity–logging measurments*, Geophysics, vol. 44, No. 7, Jul. 1979, pp. 1266–1286, 21 Figures, 4 Tables.

* cited by examiner

*Primary Examiner*—N. Le
*Assistant Examiner*—Reena Aurora
(74) *Attorney, Agent, or Firm*—Madan, Mossman & Sriram, P.C.

(57) ABSTRACT

Measurements are made with a multicomponent induction logging tool in earth formations in a borehole inclined to earth formations. A combination of principal component measurements is used to determine the horizontal resistivity of the earth formations. The determined horizontal resistivities are used in a model for inversion of other components of the data to obtain the vertical formations resistivities. When multifrequency measurements are available, frequency focusing is used.

14 Claims, 3 Drawing Sheets

METHOD OF DETERMINING FORMATION ANISOTROPY IN DEVIATED WELLS USING SEPARATION OF INDUCTION MODE

CROSS-REFERENCES TO RELATED APPLICATIONS

This application is a continuation-in-part of U.S. patent application Ser. No. 09/825,104 filed on Apr. 3, 2001. It also claims priority from U.S. Provisional Patent Application Ser. No. 60/312,655 filed on Aug. 15, 2001. The contents of both documents are fully incorporated herein by reference.

BACKGROUND OF THE INVENTION

1. Field of the Invention

The invention is related generally to the field of interpretation of measurements made by well logging instruments for the purpose of determining the properties of earth formations. More specifically, the invention is related to a method for determination of anisotropic formation resistivity in a deviated wellbore using multifrequency, multicomponent resistivity data.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones that are typically hydrocarbon bearing and are of the most interest to the instrument user. Interpreting a well log made using the electromagnetic induction resistivity well logging instruments known in the art therefore may overlook some earth formations that might be of commercial interest.

The effect of formation anisotropy on resistivity logging measurements has long been recognized. Kunz and Moran studied the anisotropic effect on the response of a conventional logging device in a borehole perpendicular to the bedding plane of t thick anisotropic bed. Moran and Gianzero extended this work to accommodate an arbitrary orientation of the borehole to the bedding planes.

Rosthal (U.S. Pat. No. 5,329,448) discloses a method for determining the horizontal and vertical conductivities from a propagation or induction well logging device. The method assumes the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

Hagiwara (U.S. Pat. No. 5,656,930) shows that the log response of an induction-type logging tool can be described by an equation of the form $$V \propto \frac{i}{L^3}(-2e^{ikL}(1-ikL) + ikl(e^{ik\beta} - e^{ikL})) \quad (1)$$

where $$\beta^2 = \cos^2\theta + \lambda^2 \sin^2\theta \quad (2)$$

and $$k^2 = \omega^2 \mu(\in_h + i\sigma_h/\omega) \quad (3)$$

where L is the spacing between the transmitter and receiver, k is the wavenumber of the electromagnetic wave, $\mu$ is the magnetic permeability of the medium, $\theta$ is the deviation of the borehole angle from the normal to the formation, $\lambda$ is the anisotropy factor for the formation, $\omega$ is the angular frequency of the electromagnetic wave, $\sigma_h$ is the horizontal conductivity of the medium and $\in_h$ is the horizontal dielectric constant of the medium.

Eq. (3) is actually a pair of equations, one corresponding to the real part and one corresponding to the imaginary part of the measured signal, and has two unknowns. By making two measurements of the measured signal, the parameters k and $\beta$ can be determined. The two needed measurements can be obtained from (1) R and X signals from induction logs, (2) phase and attenuation measurements from induction tools, (3) phase or attenuation measurements from induction tools with two different spacings, or (4) resistivity measurements at two different frequencies. In the low frequency limit, ∈ can be neglected in Eq. (3) and from known values of ω and μ, the conductivity σ can be determined from k, assuming a value of μ equal to the permittivity of free space.

Wu (U.S. Pat. No. 6,092,024) recognized that the solution to eqs. (1)–(3) may be non-unique and showed how this ambiguity in the solution may be resolved using a plurality of measurements obtained from multiple spacings and/or multiple frequencies.

One solution to the limitation of the induction instruments known in the art is to include a transverse transmitter coil and a transverse receiver coil on the induction instrument, whereby the magnetic moments of these transverse coils is substantially perpendicular to the axis of the instrument. Such as solution was suggested in Tabarovsky and Epov, "Geometric and Frequency Focusing in Exploration of Anisotropic Seams", Nauka, USSR Academy of Science, Siberian Division, Novosibirsk, pp. 67–129 (1972). Tabarovsky and Epov suggest various arrangements of transverse transmitter coils and transverse receiver coils, and present simulations of the responses of these transverse coil systems configured as shown therein. Tabarovsky and Epov also describe a method of substantially reducing the effect on the voltage induced in transverse receiver coils which would be caused by eddy currents flowing in the wellbore and invaded zone. The wellbore is typically filled with a conductive fluid known as drilling mud. Eddy currents that flow in the drilling mud can substantially affect the magnitude of voltages induced in the transverse receiver coils. The wellbore signal reduction method described by Tabarovsky and Epov can be described as "frequency focusing", whereby induction voltage measurements are made at more than one frequency, and the signals induced in the transverse receiver coils are combined in a manner so that the effects of eddy currents flowing within certain geometries, such as the wellbore and invasion zone, can be substantially eliminated from the final result. Tabarovsky and Epov, however, do not suggest any configuration of signal processing circuitry which could perform the frequency focusing method suggested in their paper.

Strack et al. (U.S. Pat. No. 6,147,496) describe a multicomponent logging tool comprising a pair of 3-component transmitters and a pair of 3-component receivers. Using measurements made at two different frequencies, a combined signal is generated having a reduced dependency on the electrical conductivity in the wellbore region. U.S. Pat. No. 5,781,436 to Forgang et al, the contents of which are fully incorporated herein by reference, discloses a suitable hardware configuration for multifrequency, multicomponent induction logging.

U.S. Pat. No. 5,999,883 issued to Gupta et al, (the "Gupta patent"), the contents of which are fully incorporated here by reference, discloses a method for determination of an initial estimate of the horizontal and vertical conductivity of anisotropic earth formations. Electromagnetic induction signals induced by induction transmitters oriented along three mutually orthogonal axes are measured at a single frequency. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes that is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter. One drawback in the teachings of Gupta et al is that the step of determination of the relative angle of inclination of the required measurements of three components of data with substantially identical transmitter-receiver spacings. Because of limitations on the physical size of the tools, this condition is difficult to obtain; consequently the estimates of resistivities are susceptible to error. In addition, due to the highly nonlinear character of the response of multicomponent tools, such inversion methods are time consuming at a single frequency and even more so at multiple frequencies.

Analysis of the prior art leads to the conclusion that known methods of determining anisotropic resistivities in real time require very low frequencies; as a consequence of the low frequencies, the signal-to-noise ratio in prior art methods is quite low.

Co-pending U.S. patent application Ser. No. 09/825,104, (referred to hereafter as the '104 application) filed on Apr. 3, 2001 teaches a computationally fast method of determination of horizontal and vertical conductivities of subsurface formations using a combination of data acquired with a transverse induction logging tool such as the 3DEX$^{SM}$ tool and data acquired with a conventional high definition induction logging tool (HDIL). The data are acquired in a vertical borehole. The HDIL data are used to determine horizontal resistivities that are used in an isotropic model to obtain expected values of the transverse components of the 3DEX$^{SM}$. Differences between the model output and the acquired 3DEX$^{SM}$ data are indicative of anisotropy and this difference is used to derive an anisotropy factor. The method described therein has difficulties in deviated boreholes as the HDIL measurements used to derive the isotropic model are responsive to both horizontal and vertical resistivity.

There is a need for a fast and robust method of determination of anisotropic resistivity. Such a method should preferably be able to use high frequency measurements that are known to have better signal-to-noise ratio than low frequency methods. The present invention satisfies this need.

SUMMARY OF THE INVENTION

A method of logging subsurface formations using data acquired with a transverse induction logging tool, the formation having a horizontal conductivity and a vertical conductivity, by obtaining a plurality of frequencies measurements indicative of vertical and horizontal conductivities in a tool referenced coordinate system. The data are transformed to a subsurface formation coordinate system. Multifrequency focusing is applied to the measurements at a plurality of frequencies. Horizontal formation conductivities are determined from a subset of the focused conductivity measurements. Vertical formation conductivities are determined from the focused conductivity measurements associated with the subsurface formation and the horizontal conductivities.

In a preferred embodiment of the invention, a transformation independent of the formation azimuth may be used to determine the conductivity of the transversely anisotropic formation.

DETAILED DESCRIPTION OF THE INVENTION

Figure 1:
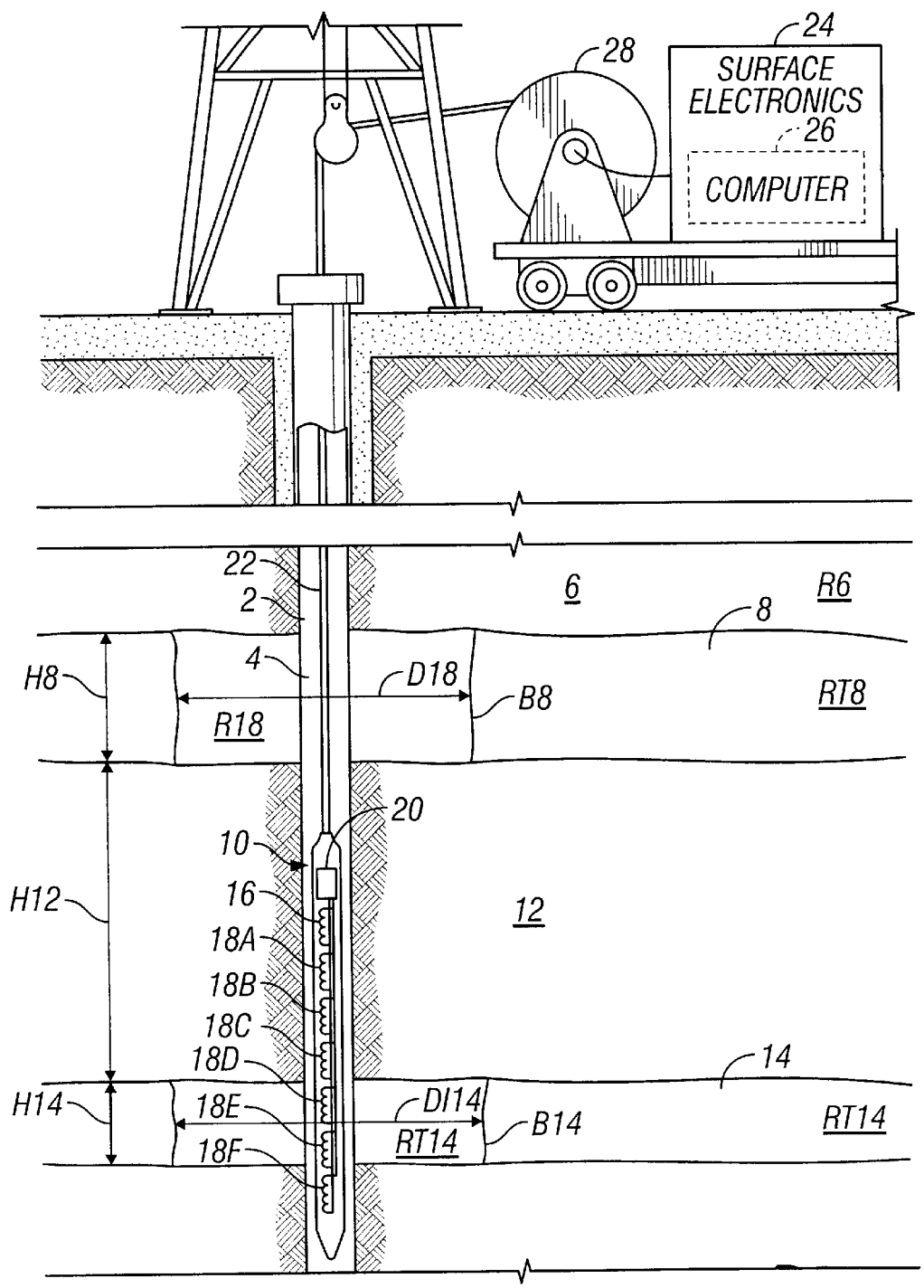
FIG. 1(Prior art) shows an induction instrument disposed in a wellbore penetrating earth formations.

FIG. 1 (prior art) shows an induction well logging instrument 10 disposed in a wellbore 2 penetrating earth formations. The earth formations are shown generally at 6, 8, 12 and 14. The instrument 10 is typically lowered into the wellbore 2 at one end of an armored electrical cable 22, by means of a winch 28 or similar device known in the art. An induction well logging instrument which will generate appropriate types of signals for performing the process of the present invention is described, for example, in U.S. Pat. No. 5,452,761 issued to Beard et al. The prior art induction logging tool includes a transmitter coil and a plurality of receiver coils 18A–18F. The coils in the prior art device are oriented with the coil axes parallel to the axis of the tool and to the wellbore.

Figure 2:
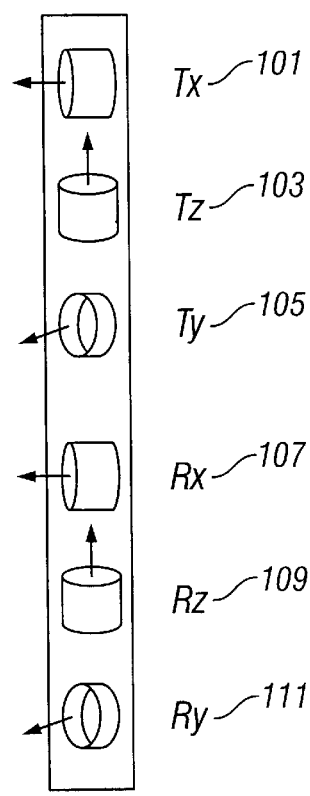
FIG. 2 shows the arrangement of transmitter and receiver coils in a preferred embodiment of the present invention marketed under the name 3DEX$^{SM}$.

Turning now to FIG. 2, the configuration of transmitter and receiver coils in a preferred embodiment of the 3DExplorer™ induction logging instrument of Baker Hughes is disclosed. Such a logging instrument is an example of a transverse induction logging tool. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are receivers 107, 109 and 111, referred to as the $R_x$, $R_z$, and $R_y$ receivers, for measuring the corresponding components ($H_{xx}$, $H_{yy}$, $H_{zz}$) of induced signals. In addition, cross-components are also measured. These are denoted by $H_{xy}$, $H_{xz}$ etc.

Figure 3:
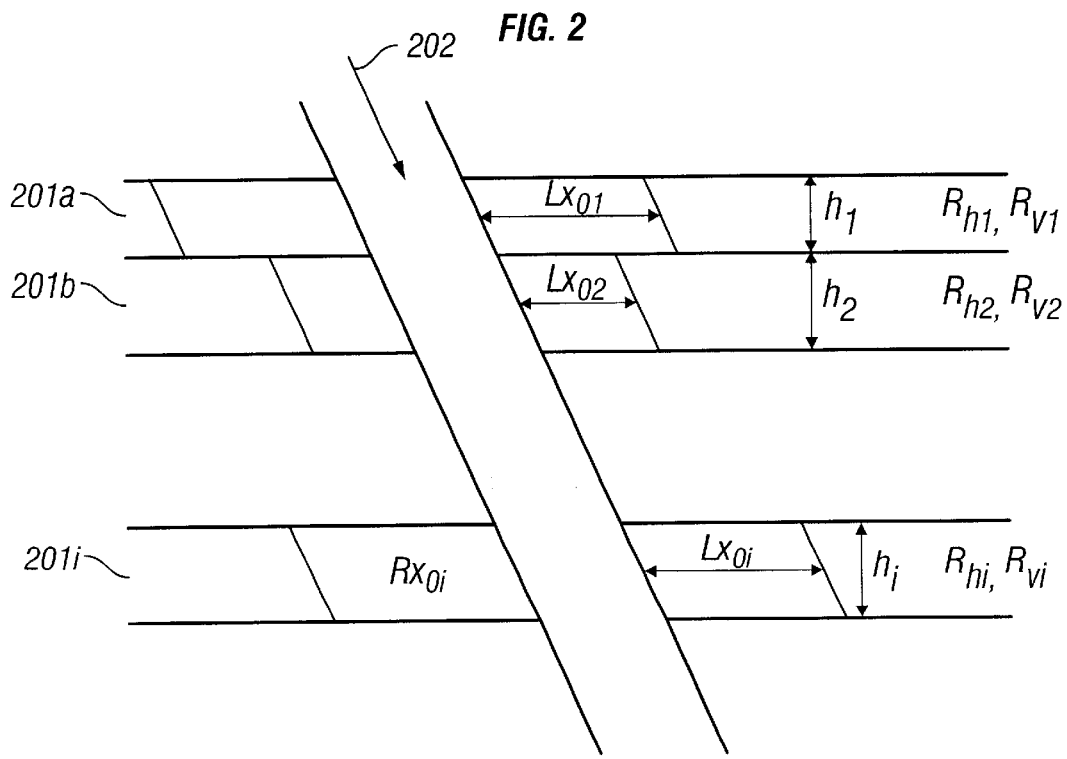
FIG. 3 shows an earth model example used in the present invention.

FIG. 3 is a schematic illustration of the model used in the present invention. The subsurface of the earth is characterized by a plurality of layers $201a$, $201b$, ..., $201i$. The layers have thicknesses denoted by $h_1$, $h_2$, ... $h_i$. The horizontal and vertical resistivities in the layers are denoted by $R_{h1}$, $R_{h2}$, ... $R_{hi}$ and $R_{v1}$, $R_{v2}$, ... $R_{vi}$ respectively. Equivalently, the model may be defined in terms of conductivities (reciprocal of resistivity). The borehole is indicated by 202 and associated with each of the layers are invaded zones in the vicinity of the borehole wherein borehole fluid has invaded the formation and altered is properties so that the electrical properties are not the same as in the uninvaded portion of the formation. The invaded zones have lengths $L_{x01}$, $L_{x02}$, ... $L_{x0i}$ extending away from the borehole. The resistivities in the invaded zones are altered to values $R_{x01}$, $R_{x02}$, ... $R_{x0i}$. In the embodiment of the invention discussed here, the invaded zones are assumed to be isotropic while an alternate embodiment of the invention includes invaded zones that are anisotropic, i.e., they have different horizontal and vertical resistivities. It should further be noted that the discussion of the invention herein may be made in terms of resistivities or conductivities (the reciprocal of resistivity). The z-component of the 3DEX$^{SM}$ tool is oriented along the borehole axis and makes an angle θ(not shown) with the normal to the bedding plane. The x-component of the tool makes an angle φ with the "up" direction.

In the '104 application to Tabarovsky, et al. multifrequency, multicomponent induction data are obtained using, for example, the 3DEX™ tool, and a multifrequency focusing is applied to these data. As disclosed in U.S. Pat. No. 5,703,773 to Tabarovsky et al., the contents of which are fully incorporated herein by reference, the response at multiple frequencies may be approximated by a Taylor series expansion of the form:

$$\begin{bmatrix} \sigma_a(\omega_1) \\ \sigma_a(\omega_2) \\ \vdots \\ \sigma_a(\omega_{m-1}) \\ \sigma_a(\omega_m) \end{bmatrix} = \begin{bmatrix} 1 & \omega_1^{1/2} & \omega_1^{3/2} & \cdots & \omega_1^{n/2} \\ 1 & \omega_2^{1/2} & \omega_1^{3/2} & \cdots & \omega_2^{n/1} \\ \vdots & \vdots & \vdots & \ddots & \vdots \\ 1 & \omega_{m-1}^{1/2} & \omega_{m-1}^{3/2} & \cdots & \omega_{m-1}^{n/2} \\ 1 & \omega_m^{1/2} & \omega_m^{3/2} & \cdots & \omega_m^{n/2} \end{bmatrix} \begin{bmatrix} s_0 \\ s_{1/2} \\ \vdots \\ s_{(n-1)/2} \\ s_{n/2} \end{bmatrix} \quad (4)$$

In a preferred embodiment of the invention of the '104 application, the number m of frequencies ω is ten. In eq.(4), n is the number of terms in the Taylor series expansion. This can be any number less than or equal to m. The coefficient $s_{3/2}$ of the $\omega^{3/2}$ term (ω being the square of k, the wave number) is generated by the primary field and is relatively unaffected by any inhomogeneities in the medium surround the logging instrument, i.e., it is responsive primarily to the formation parameters and not to the borehole and invasion zone. In fact, the coefficient $s_{3/2}$ of the $\omega^{3/2}$ term is responsive to the formation parameters as though there were no borehole in the formation. Specifically, these are applied to the $H_{xx}$ and $H_{yy}$ components. Those versed in the art would recognize that in a vertical borehole, the $H_{xx}$ and $H_{yy}$ would be the same, with both being indicative of the vertical conductivity of the formation. In one embodiment of the invention, the sum of the $H_{xx}$ and $H_{yy}$ is used so as to improve the signal to noise ratio (SNR). This multifrequency focused measurement is equivalent to the zero frequency value. As would be known to those versed in the art, the zero frequency value may also be obtained by other methods, such as by focusing using focusing electrodes in a suitable device.

Along with the 3DEX™, the method of the '104 application also uses data from a prior art High Definition Induction Logging (HDIL) tool having transmitter and receiver coils aligned along the axis of the tool. These data are inverted using a method such as that taught by Tabarovsky et al, or by U.S. Pat. No. 5,884,227 to Rabinovich et al., the contents of which are fully incorporated herein by reference, to give an isotropic model of the subsurface formation. Instead of, or in addition to the inversion methods, a focusing method may also be used to derive the initial model. Such focusing methods would be known to those versed in the art and are not discussed further here. As discussed above, the HDIL tool is responsive primarily to the horizontal conductivity of the earth formations when run in a borehole that is substantially orthogonal to the bedding planes. The inversion methods taught by Tabarovsky et al and by Rabinovich et al are computationally fast and may be implemented in real time. These inversions give an isotropic model of the horizontal conductivities (or resistivities)

Using the isotropic model derived, a forward modeling is used in the '104 application to calculate a synthetic response of the 3DEX™ tool at a plurality of frequencies. A suitable forward modeling program for the purpose is disclosed in Tabarovsky and Epov "Alternating Electromagnetic Field in an Anisotropic Layered Medium" *Geol. Geoph., No.* 1, pp. 101–109. (1977). Multifrequency focusing is then applied to these synthetic data. In a preferred embodiment of the invention of the '104 application, the method taught by Tabarovsky is used for the purpose.

In the absence of anisotropy, the output from model output should be identical to the multifrequency focused measurements. Denoting by $\sigma_{iso}$ the multifrequency focused transverse component synthetic data from and by $\sigma_{meas}$ the multifrequency focused field data from, the anisotropy factor $\lambda$ is then calculated in the '104 application.

The $H_{xx}$ for an anisotropic medium is given by $$H_{xx} = -\frac{M}{4L^3}\left[-\left(\frac{L}{\delta_v}\right)^2 + \left(\frac{1}{3}+\frac{1}{\lambda}\right)\left(\frac{L}{\delta_h}\right)^3\right] \quad (5)$$

where $$\delta_v = \sqrt{\frac{2}{\omega\mu\sigma_v}}, \delta_h = \sqrt{\frac{2}{\omega\mu\sigma_h}}, \lambda = \frac{\sigma_h}{\sigma_v}.$$

For a three-coil subarray, $$H_{xx} = -\frac{1}{4\pi}\left(\frac{1}{3}+\frac{1}{\lambda}\right)\left(\frac{\omega\mu\sigma_h}{2}\right)^{3/2}\sum M_i \quad (6)$$

Upon introducing the apparent conductivity for $H_{xx}$ this gives $$\sigma_{meas}^{3/2} = \frac{3}{4}\left(\frac{1}{3}+\frac{1}{\lambda}\right)\sigma_h^{3/2}$$

or $$(\sigma_{meas}^{3/2} - \sigma_{iso}^{3/2}) = \sigma_h^{3/2}\left(\frac{1}{4}+\frac{3}{4\lambda}-1\right) = \sigma_h^{3/2}\left(\frac{3}{4\lambda}-\frac{3}{4}\right)$$

which gives the result $$\lambda = \frac{1}{1-\frac{4}{3}\left(\frac{\sigma_{iso}^{3/2}-\sigma_{meas}^{3/2}}{\sigma_t^{3/2}}\right)} \quad (7)$$

where $\sigma_t$ is the conductivity obtained from the HDIL data, i.e., the horizontal conductivity. The vertical conductivity is obtained by dividing $\sigma_t$ by the anisotropy factor from eq. (5). An important aspect of the '104 application is that in a vertical borehole, the measurements made by a HDIL tool depend only on the horizontal conductivities and not on the vertical resistivities. The method of the invention disclosed there is to obtain an isotropic model from the HDIL data, use the isotropic model to predict measurements made on other components and to use a difference between the predicted and actual measurements to obtain the vertical conductivity.

Figure 4:
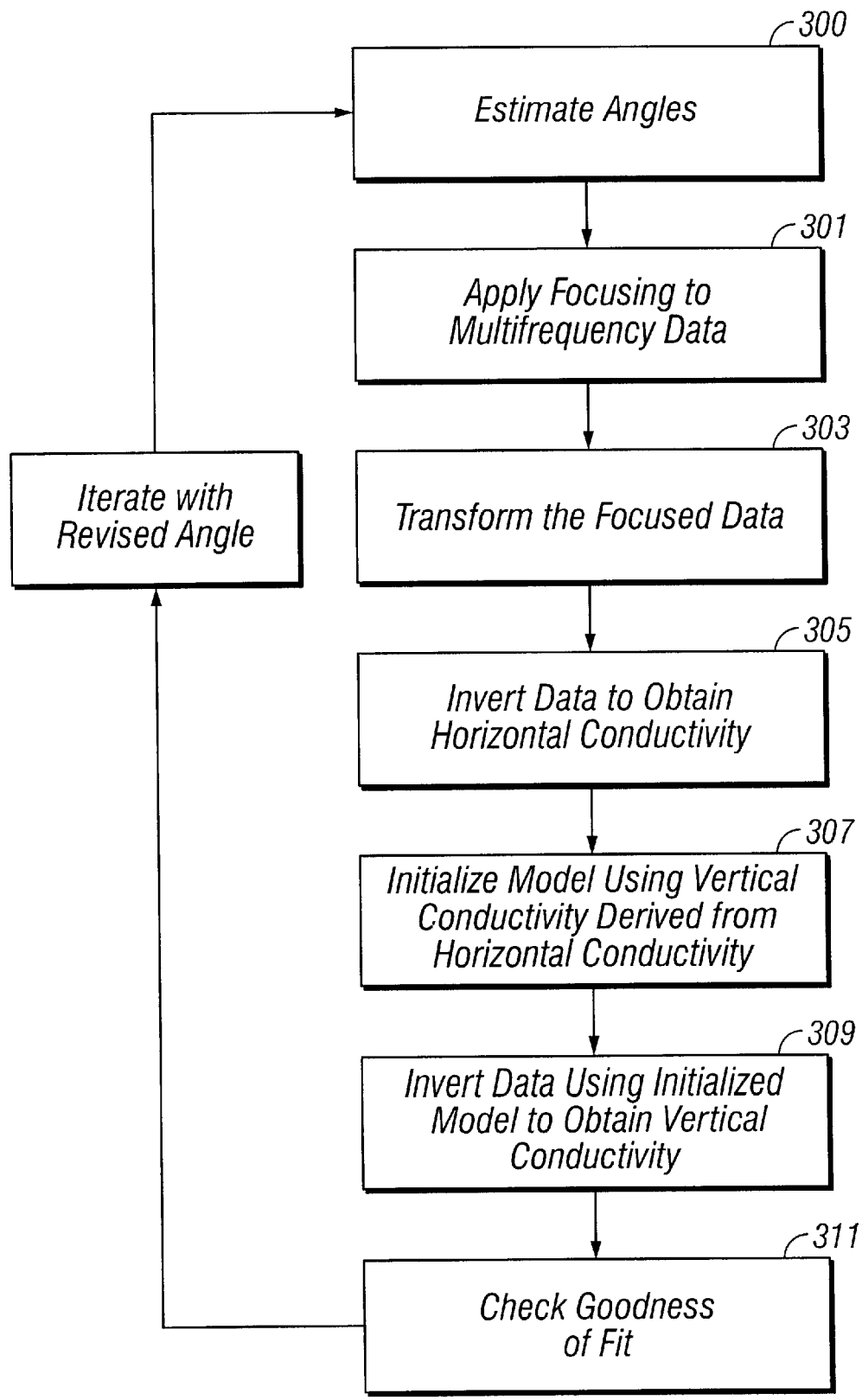
FIG. 4 is a flow chart illustrating steps comprising the present invention.

In a similar manner, the method of the present invention can be viewed as finding a combination of 3DEX$^{SM}$ measurements (called modes of the induction measurements) that are responsive only to the horizontal conductivity, deriving a model of horizontal conductivity from this combination of measurements, predicting values of other components of 3DEX$^{SM}$ measurements and using a difference between these predicted measurements and the actual measurements to determine a vertical conductivity. In a particular embodiment of the present invention, the desired combination includes only the principal component measurements, i.e., upon $H_{xx}$, $H_{yy}$, and $H_{zz}$. The flow chart of the method of the present invention is shown in FIG. 4

The method of the present invention starts with an estimate of the dip and azimuth of the formation relative to the borehole axis 300. These angles are defined below. In addition, a sensor on the logging tool also provides another angle measurement called the "toolface angle" that is also used in the analysis of the data. Multifrequency focused data are derived from multifrequency measurements 301. The data are transformed 303 as discussed below to give measurements that are indicative only of horizontal conductivity. These data are inverted 305 to give a model of the horizontal conductivity of the data. These estimates of horizontal conductivity are used in an isotropic model as estimates of the vertical conductivity 307. The measured data are then inverted using this initial estimate of vertical conductivities 309. A check is made of the goodness of fit (difference between a model output based on the inverted model and the actual measurements) 311. If the difference is below a predetermined threshold, then the model is accepted. If the difference is excessive, a iterative procedure is carried out with an updated angle estimate 313 until the result is acceptable. Any suitable iterative procedure may be used such as that based on a gradient method or a method of steepest descent. Such iterative methods would be known to those versed in the art and are not discussed further.

At this point we develop the principal component structure for measuring formation anisotropy in bedding planes when the borehole is not normal (perpendicular) to the bedding plane. For simplifying the notation, and to avoid confusion, the x-, y- and z-components in the tool coordinates are called hereafter the (1, 2, 3) coordinate system. The x-, y- and z-components in the earth coordinate system will be referred to as such.

In the tool coordinate system, the matrix of magnetic components, $H_T$, may be represented in the following form:

$$\hat{H}_T = \begin{pmatrix} h_{11} & h_{12} & h_{13} \\ h_{21} & h_{22} & h_{23} \\ h_{31} & h_{32} & h_{33} \end{pmatrix} \quad (8)$$

For layered formations, the matrix, $H_T$, is symmetric. We measure three diagonal elements, $h_{11}$, $h_{22}$, and $h_{33}$. The non-diagonal elements are not needed in the present invention.

In the earth coordinate system, $\{x, y, z\}$, associated with the plane formation boundaries (z-axis is perpendicular to the boundaries and directed downwards) the magnetic matrix may be presented as follows:

$$\hat{H}_M = \begin{pmatrix} h_{xx} & h_{xy} & h_{xz} \\ h_{xy} & h_{yy} & h_{yz} \\ h_{xz} & h_{yz} & h_{zz} \end{pmatrix} \quad (9)$$

The formation resistivity is described as a tensor, $\rho$. In the coordinate system associated with a formation, the resistivity tensor has only diagonal elements in the absence of azimuthal anisotropy:

$$\hat{\rho} = \begin{pmatrix} \rho_t & 0 & 0 \\ 0 & \rho_t & 0 \\ 0 & 0 & \rho_n \end{pmatrix} \quad (10)$$

$\rho_t = \rho_{xx} = \rho_{yy}$, $\rho_n = \rho_{zz}$

The "tool coordinate" system (1-, 2-, 3-) can be obtained from the "formation coordinate" system (x-, y-, z-) as a result of two sequential rotations:

(1) Rotation about the axis "2" by the angle θ, such that the axis "3" in a new position (let us call it "3'") becomes parallel to the axis z of the "tool" system;

(2) Rotation about the axis "3'" by the angle Φ, such that the new axis "1" (let us call it "1'") becomes parallel to the axis x of the tool system.

In the present invention, an iterative procedure as shown in FIG. 4 is used for θ and φ. θ is the relative inclination of the borehole axis to the normal to the bedding while φ is the azimuth. An initial estimate for θ and φ may be determined from borehole surveys or from resistivity imaging devices and from knowledge of the toolface angle.

The first rotation is described using matrices θ and $\theta^T$:

$$\hat{\theta} = \begin{pmatrix} C_\theta & 0 & S_\theta \\ 0 & 1 & 0 \\ -S_\theta & 0 & C_\theta \end{pmatrix}, \hat{\theta}^T = \begin{pmatrix} C_\theta & 0 & -S_\theta \\ 0 & 1 & 0 \\ S_\theta & 0 & C_\theta \end{pmatrix} \quad (11)$$

Here, $C_\theta = \cos\theta$, $S_\theta = \sin\theta$

The second rotation is described using matrices Φ and $\Phi^T$:

$$\hat{\varphi} = \begin{pmatrix} C_\varphi & -S_\varphi & 0 \\ S_\varphi & C_\varphi & 0 \\ 0 & 0 & 1 \end{pmatrix}, \hat{\varphi}^T = \begin{pmatrix} C_\varphi & S_\varphi & 0 \\ -S_\varphi & C_\varphi & 0 \\ 0 & 0 & 1 \end{pmatrix} \quad (12)$$

Here, $C_\Phi = \cos\Phi$, $S_\Phi = \sin\Phi$

Matrices $H_M$ (the formation coordinate system) and $H_T$ (the tool coordinate system) are related as follows:

$$\hat{H}^T = \hat{R}^T \hat{H}_m \hat{R} \quad (13)$$

$$\hat{R}^T = \hat{\Phi}^T \hat{\theta}^T, \hat{R} = \hat{\theta}\hat{\Phi} \quad (14)$$

It is worth noting that the matrix $H_M$ contains zero elements:

$$h_{xy} = h_{yx} = 0 \quad (15)$$

This is true for multifrequency focused measurements as described below. It is also important to note that the following three components of the matrix $H_M$ depend only on the horizontal resistivity.

$$h_{xz} = f_{xz}(\rho_t), h_{yz} = f_{yz}(\rho_t), h_{zz} = f_{zz}(\rho_t) \quad (16)$$

Two remaining elements depend on both horizontal and vertical resistivities.

$$h_{xx} = f_{xx}(\rho_t, \rho_n), h_{yy} = f_{yy}(\rho_t, \rho_n) \quad (17)$$

Taking into account Equations (11), (12), (14) and (15), we can re-write Equation (13) as follows:

$$\begin{pmatrix} h_{11} & h_{12} & h_{13} \\ h_{21} & h_{22} & h_{23} \\ h_{31} & h_{32} & h_{33} \end{pmatrix} = \begin{pmatrix} C_\varphi & S_\varphi & 0 \\ -S_\varphi & C_\varphi & 0 \\ 0 & 0 & 1 \end{pmatrix} \begin{pmatrix} C_\theta & 0 & -S_\theta \\ 0 & 1 & 0 \\ S_\theta & 0 & C_\theta \end{pmatrix} \quad (18)$$

$$\begin{pmatrix} h_{xx} & 0 & h_{xz} \\ 0 & h_{yy} & h_{yz} \\ h_{xz} & h_{yz} & h_{zz} \end{pmatrix} \begin{pmatrix} C_\theta & 0 & S_\theta \\ 0 & 1 & 0 \\ -S_\theta & 0 & C_\theta \end{pmatrix}$$

$$\begin{pmatrix} C_\varphi & -S_\varphi & 0 \\ S_\varphi & C_\varphi & 0 \\ 0 & 0 & 1 \end{pmatrix}$$

The following expanded calculations are performed in order to present Equation (18) in a form more convenient for analysis.

$$\hat{A}_1 = \begin{pmatrix} C_\theta & 0 & S_\theta \\ 0 & 1 & 0 \\ -S_\theta & 0 & C_\theta \end{pmatrix} \begin{pmatrix} C_\varphi & -S_\varphi & 0 \\ S_\varphi & C_\varphi & 0 \\ 0 & 0 & 1 \end{pmatrix} = \begin{pmatrix} C_\theta C_\varphi & -C_\theta S_\varphi & S_\theta \\ S_\varphi & C_\varphi & 0 \\ -S_\theta C_\varphi & S_\theta S_\varphi & C_\theta \end{pmatrix}$$

-continued $$\hat{A}_2 = \begin{pmatrix} h_{xx} & 0 & h_{xz} \\ 0 & h_{yy} & h_{yz} \\ h_{xz} & h_{yz} & h_{zz} \end{pmatrix} \begin{pmatrix} C_\theta C_\varphi & -C_\theta S_\varphi & S_\theta \\ S_\varphi & C_\varphi & 0 \\ -S_\theta C_\varphi & S_\theta S_\varphi & C_\theta \end{pmatrix}$$

$$= \begin{pmatrix} C_\theta C_\varphi h_{xx} - S_\theta C_\varphi h_{xz} & -C_\theta S_\varphi h_{xx} + S_\theta S_\varphi h_{xz} & S_\theta h_{xx} + C_\theta h_{xz} \\ S_\varphi h_{yy} - S_\theta C_\varphi h_{yz} & C_\varphi h_{yy} + S_\theta S_\varphi h_{yz} & C_\theta h_{yz} \\ C_\theta C_\varphi h_{xz} + S_\varphi h_{yz} - S_\theta C_\varphi h_{zz} & -C_\theta S_\varphi h_{xz} + C_\varphi h_{yz} + S_\theta S_\varphi h_{zz} & S_\theta h_{xz} + C_\theta h_{zz} \end{pmatrix}$$

$$\hat{A}_3 = \begin{pmatrix} C_\theta & 0 & -S_\theta \\ 0 & 1 & 0 \\ S_\theta & 0 & C_\theta \end{pmatrix} \begin{pmatrix} C_\theta C_\varphi h_{xx} - S_\theta C_\varphi h_{xz} & -C_\theta S_\varphi h_{xx} + S_\theta S_\varphi h_{xz} & S_\theta h_{xx} + C_\theta h_{xz} \\ S_\varphi h_{yy} - S_\theta C_\varphi h_{yz} & C_\varphi h_{yy} + S_\theta S_\varphi h_{yz} & C_\theta h_{yz} \\ C_\theta C_\varphi h_{xz} + S_\varphi h_{yz} - S_\theta C_\varphi h_{zz} & -C_\theta S_\varphi h_{xz} + C_\varphi h_{yz} + S_\theta S_\varphi h_{zz} & S_\theta h_{xz} + C_\theta h_{zz} \end{pmatrix}$$

The components of $\hat{A}_3$ are given as $a_{11}^{(3)} = C_\theta^2 C_\Phi^2 h_{xx} - C_\theta S_\theta C_\Phi h_{xz} - C_\theta S_\theta C_\Phi h_{xz} - S_\theta S_\Phi h_{yz} + S_\theta^2 C_\Phi h_{zz}$ $[a_{11}^{(3)} = C_\theta^2 C_\Phi h_{xx} - 2C_\theta S_\theta C_\Phi h_{xz} - S_\theta S_\Phi h_{yz} + S_\theta^2 C_\Phi h_{zz}](*)$ $a_{12}^{(3)} = -C_\theta^2 S_\Phi h_{xx} + C_\theta S_\theta S_\Phi h_{xz} + C_\theta S_\theta S_\Phi h_{xz} - S_\theta C_\Phi h_{yz} - S_\theta^2 S_\Phi h_{zz}$ $[a_{12}^{(3)} = -C_\theta^2 S_\Phi h_{xx} + 2C_\theta S_\theta S_\Phi h_{xz} - S_\theta C_\Phi h_{yz} - S_\theta^2 S_\Phi h_{zz}](*)$ $a_{13}^{(3)} = C_\theta S_\theta h_{xx} + C_\theta^2 h_{xz} - S_\theta^2 h_{xz} - C_\theta S_\theta h_{zz}$ $[a_{13}^{(3)} = C_\theta S_\theta h_{xx} + (C_\theta^2 - S_\theta^2) h_{xz} - C_\theta S_\theta h_{zz}](*)$ $[a_{21}^{(3)} = S_\Phi h_{yy} - S_\theta C_\Phi h_{yz}](*)$ $[a_{22}^{(3)} = C_\Phi h_{yy} + S_\theta S_\Phi h_{yz}](*)$ $[a_{23}^{(3)} = C_\theta h_{yz}](*)$ $a_{31}^{(3)} = C_\theta S_\theta C_\Phi h_{xx} - S_\theta^2 C_\Phi h_{xz} + C_\theta^2 C_\Phi h_{xz} + C_\theta S_\theta h_{yz} - C_\theta S_\theta C_\Phi h_{zz}$ $[a_{31}^{(3)} = C_\theta S_\theta C_\Phi h_{xx} + (C_\theta^2 - S_\theta^2) C_\Phi h_{xz} + C_\theta S_\theta h_{yz} - C_\theta S_\theta C_\Phi h_{zz}](*)$ $a_{32}^{(3)} = -C_\theta S_\theta S_\Phi h_{xx} + S_\theta^2 S_\Phi h_{xz} - C_\theta^2 S_\Phi h_{xz} + C_\theta C_\Phi h_{yz} + C_\theta S_\theta S_\Phi h_{zz}$ $[a_{32}^{(3)} = -C_\theta S_\theta S_\Phi h_{xx} - (C_\theta^2 - S_\theta^2) S_\Phi h_{xz} + C_\theta C_\Phi h_{yz} + C_\theta S_\theta S_\Phi h_{zz}](*)$ $a_{33}^{(3)} = S_\theta^2 h_{xx} + C_\theta S_\theta h_{xz} + C_\theta S_\theta h_{xz} + C_\theta^2 h_{zz}$ $[a_{33}^{(3)} = S_\theta^2 h_{xx} + 2C_\theta S_\theta h_{xz} + C_\theta^2 h_{zz}](*)$ Taking into account all the above calculations, we can represent Equation (18) in the following form:

$$\begin{pmatrix} h_{11} & h_{12} & h_{13} \\ h_{21} & h_{22} & h_{23} \\ h_{31} & h_{32} & h_{33} \end{pmatrix} = \begin{pmatrix} C_\varphi & S_\varphi & 0 \\ -S_\varphi & C_\varphi & 0 \\ 0 & 0 & 1 \end{pmatrix} \begin{pmatrix} a_{11}^3 & a_{12}^3 & a_{13}^3 \\ a_{21}^3 & a_{22}^3 & a_{23}^3 \\ a_{31}^3 & a_{32}^3 & a_{33}^3 \end{pmatrix}$$

The method of the present invention involves defining a linear combination of the measurements that are responsive substantially to the horizontal conductivity and not responsive to the vertical conductivity. In a preferred embodiment of the invention, the linear combination is that of measurements $h_{11}$, $h_{22}$, and $h_{33}$ (i.e., the principal components only), although in alternate embodiments of the invention, a linear combination of any of the measurements may be used. The example given below is that of the preferred embodiment.

Let us consider expressions for the measured principal components, $h_{11}$, $h_{22}$, and $h_{33}$:

$$\begin{cases} h_{11} = a_{11}^{(3)} C_\varphi + a_{21}^{(3)} S_\varphi \\ h_{22} = -a_{12}^{(3)} S_\varphi + a_{22}^{(3)} C_\varphi \\ h_{33} = a_{33}^{(3)} \end{cases} \quad (19)$$

More detailed representation yields:

$h_{11} = C_\theta^2 C_\Phi^2 h_{xx} - 2C_\theta S_\theta C_\Phi^2 h_{xz} - S_\theta C_\Phi S_\Phi h_{yz} + S_\theta^2 C_\Phi^2 h_{zz} + S_\Phi^2 h_{yy} - S_\theta C_\Phi S_\Phi h_{yz}$ $[h_{11} = C_\theta^2 C_\Phi^2 h_{xx} + S_\Phi^2 h_{yy} - 2C_\theta S_\theta C_\Phi^2 h_{xz} - 2S_\theta C_\Phi S_\Phi h_{yz} + S_\theta^2 C_\Phi^2 h_{zz}] \quad (20)$ $h_{22} = C_\theta^2 S_\Phi^2 h_{xx} - 2C_{\theta i\, s\theta} S_\Phi^2 h_{xz} + S_\theta C_\Phi S_\Phi h_{yz} + S_\theta^2 S_\Phi^2 h_{zz} + C_\Phi^2 h_{yy} + S_\theta C_\Phi S_\Phi h_{yz}$ $[h_{22} = C_\theta^2 S_\Phi^2 h_{xx} + C_\Phi^2 h_{yy} - 2C_\theta S_\theta S_\Phi^2 h_{xz} + 2S_\theta C_\Phi S_\Phi h_{yz} + S_\theta^2 S_\Phi^2 h_{zz}] \quad (21)$ $[h_{33} = S_\theta^2 h_{xx} + 2C_\theta S_\theta h_{xz} + C_\theta^2 h_{zz}] \quad (22)$ Expressions for each component, $h_{11}$, $h_{22}$, and $h_{33}$, contain two types of functions: some depending only on $\rho_t$, and some others depending on both, $\rho_t$ and $\rho_n$. Equations (13)–(15) may be represented in the following form:

$$\begin{cases} h_{11} = C_\theta^2 C_\varphi^2 h_{xx} + S_\varphi^2 h_{yy} + f_{11}(\rho_t) \\ h_{22} = C_\theta^2 S_\varphi^2 h_{xx} + C_\varphi^2 h_{yy} + f_{22}(\rho_t) \\ h_{33} = S_\theta^2 h_{xx} + f_{33}(\rho_t) \end{cases} \quad (23)$$

Here, $$\begin{cases} f_{11}(\rho_t) = -2C_\theta S_\theta C_\varphi^2 h_{xz} - 2S_\theta C_\varphi S_\varphi h_{yz} + S_\theta^2 C_\varphi^2 h_{zz} \\ f_{22}(\rho_t) = -2C_\theta S_\theta S_\varphi^2 h_{xz} + 2S_\theta C_\varphi S_\varphi h_{yz} + S_\theta^2 S_\varphi^2 h_{zz} \\ f_{33}(\rho_t) = 2C_\theta S_\theta h_{xz} + C_\theta^2 h_{zz} \end{cases} \quad (24)$$

A linear combination of Equations (23) is defined in the form:

$h = \alpha h_{11} + \beta h_{22} + h_{33}$ \quad (25)

Detailed consideration of Equation (25) yields:

$h = \alpha C_\theta^2 C_\Phi^2 h_{xx} + \alpha S_\Phi^2 h_{yy} + \alpha f_{11}(\rho_t) + \beta C_\theta^2 S_\Phi^2 h_{xx} + \beta C_\Phi^2 h_{yy} + \beta f_{22}(\rho_t) + S_\theta^2 h_{xx} + f_{33}(\rho_t)$ $h = (\alpha C_\theta^2 C_\Phi^2 + \beta C_\theta^2 S_\Phi^2 + S_\theta^2) h_{xx} + (\alpha S_\Phi^2 + \beta C_\Phi^2) h_{yy} + \alpha f_{11}(\rho_t) + \beta f_{22}(\rho_t) + f_{33}(\rho_t)$ The method of the present invention involves defining the coefficients, $\alpha$ and $\beta$, in such a way that the resulting linear combination, h, does not depend on the vertical resistivity.

To achieve that, we need to null the following part of the expression for h:

$$h_f = (\alpha C_\theta^2 C_\Phi^2 + \beta C_\theta^2 S_\Phi^2 + S_\theta^2) h_{xx} + (\alpha S_\Phi^2 + \beta C_\Phi^2) h_{yy} = 0 \quad (26)$$

Imposing the following conditions satisfies equation (26):

$$\begin{cases} \alpha C_\theta^2 C_\varphi^2 + \beta C_\theta^2 S_\varphi^2 + S_\theta^2 = 0 \\ \alpha S_\varphi^2 + \beta C_\varphi^2 = 0 \end{cases} \quad (27)$$

Let us calculate the coefficients, α and β. The second Equation in (27) yields:

$$\beta = -\frac{S_\varphi^2}{C_\varphi^2} \alpha \quad (28)$$

After substitution of Equation (28) in the first Equation of (27), we obtain:

$$\alpha C_\theta^2 C_\varphi^2 - \left(\frac{S_\varphi^2}{C_\varphi^2}\alpha\right) C_\theta^2 S_\varphi^2 + S_\theta^2 = 0 = \alpha C_\theta^2 \left(C_\varphi^2 - \frac{S_\varphi^4}{C_\varphi^2}\right) + S_\theta^2 \quad (29)$$

$$\Rightarrow \alpha C_\theta^2 \frac{C_\varphi^4 - S_\varphi^4}{C_\varphi^2} = -S_\theta^2$$

$$\Rightarrow \alpha C_\theta^2 \frac{(C_\varphi^2 + S_\varphi^2)(C_\varphi^2 - S_\varphi^2)}{C_\varphi^2} = -S_\theta^2$$

$$\Rightarrow \alpha C_\theta^2 \frac{C_{2\varphi}}{C_\varphi^2} = -S_\theta^2$$

$$\alpha = -\frac{C_\varphi^2}{C_{2\varphi}} \frac{S_\theta^2}{C_\theta^2}$$

To obtain the coefficient, β, let us substitute Equation (29) in Equation (28):

$$\beta = \frac{S_\varphi^2}{C_\varphi^2} \frac{C_\varphi^2}{C_{2\varphi}} \frac{S_\theta^2}{C_\theta^2} = \frac{S_\varphi^2}{C_{2\varphi}} \frac{S_\theta^2}{C_\theta^2} \quad (30)$$

Finally, $$\begin{cases} \alpha = -\frac{C_\varphi^2}{C_{2\varphi}} \frac{S_\theta^2}{C_\theta^2} \\ \beta = \frac{S_\varphi^2}{C_{2\varphi}} \frac{S_\theta^2}{C_\theta^2} \end{cases} \quad (31)$$

It is convenient to normalize coefficients, α and β. Let us introduce a normalization factor, κ.

$$\kappa = \sqrt{1 + \alpha^2 + \beta^2} \quad (32)$$

Equation (25) may be presented in the form:

$$h_f = \alpha' h_{11} + \beta' h_{22} + \gamma' h_{33} \quad (33)$$

Here, $$h_{f'} = h_f/\kappa, \; \alpha' = \alpha/\kappa, \; \beta' = \beta/\kappa, \; \gamma' = \gamma/\kappa. \quad (34)$$

Calculations yield:

$$\kappa^2 = 1 + \frac{C_\varphi^4}{C_{2\varphi}^2} \frac{S_\theta^4}{C_\theta^4} + \frac{S_\varphi^4}{C_{2\varphi}^2} \frac{S_\theta^4}{C_\theta^4} = 1 + \frac{C_\varphi^4 + S_\varphi^4}{C_{2\varphi}^2} \frac{S_\theta^4}{C_\theta^4} = \frac{C_{2\varphi}^2 C_\theta^4 + (C_\varphi^4 + S_\varphi^4) S_\theta^4}{C_{2\varphi}^2 C_\theta^4}$$

$$\kappa = \frac{\sqrt{C_{2\varphi}^2 C_\theta^4 + (C_\varphi^4 + S_\varphi^4) S_\theta^4}}{C_{2\varphi} C_\theta^2} \quad (35)$$

Consequently, $$\gamma' = \frac{C_{2\varphi} C_\theta^2}{\sqrt{C_{2\varphi}^2 C_\theta^4 + (C_\varphi^4 + S_\varphi^4) S_\theta^4}}$$

$$\alpha' = -\frac{C_\varphi^2}{C_{2\varphi}} \frac{S_\theta^2}{C_\theta^2} \cdot \frac{C_{2\varphi} C_\theta^2}{\sqrt{C_{2\varphi}^2 C_\theta^4 + (C_\varphi^4 + S_\varphi^4) S_\theta^4}} = -\frac{C_\varphi^2 S_\theta^2}{\sqrt{C_{2\varphi}^2 C_\theta^4 + (C_\varphi^4 + S_\varphi^4) S_\theta^4}}$$

$$\beta' = \frac{S_\varphi^2}{C_{2\varphi}} \frac{S_\theta^2}{C_\theta^2} \cdot \frac{C_{2\varphi} C_\theta^2}{\sqrt{C_{2\varphi}^2 C_\theta^4 + (C_\varphi^4 + S_\varphi^4) S_\theta^4}} = \frac{S_\varphi^2 S_\theta^2}{\sqrt{C_{2\varphi}^2 C_\theta^4 + (C_\varphi^4 + S_\varphi^4) S_\theta^4}}$$

Finally, we obtain:

$$\begin{cases} \alpha' = -\frac{C_\varphi^2 S_\theta^2}{\kappa'} \\ \beta' = \frac{S_\varphi^2 S_\theta^2}{\kappa'} \\ \gamma' = \frac{C_{2\varphi} C_\theta^2}{\kappa'} \end{cases} \quad (36)$$

Here, $$\kappa' = \sqrt{C_{2\Phi}^2 C_\theta^4 + (C_\Phi^4 + S_\Phi^4) S_\theta^4} \quad (37)$$

The coefficient, κ, degenerates under the following conditions:

$$\theta = 0, \; \Phi = \pi/4 \Rightarrow \kappa' = 0 \quad (38)$$

Using the derivation given above, for an estimated value of θ and φ, the conductivities may be derived. A difference between the model output and the measured values may then be used in the iterative procedure described with respect to FIG. 4.

The derivation above has been done for a single frequency data. Multifrequency Focused (MFF) data is a linear combination of single frequency measurements so that the derivation given above is equally applicable to MFF data. It can be proven that the three principle 3DEX™ measurements, MFF (multi-frequency focusing) processed, may be expressed in the following form:

$$\begin{pmatrix} MFF(h_{11}) \\ MFF(h_{22}) \\ MFF(h_{33}) \end{pmatrix} = \begin{pmatrix} a_1 & a_2 & a_3 & a_4 \\ b_1 & b_2 & b_3 & b_4 \\ c_1 & c_2 & c_3 & c_4 \end{pmatrix} \begin{pmatrix} MFF(h_{xx}) \\ MFF(h_{yy}) \\ MFF(h_{zz}) \\ MFF(h_{xz}) \end{pmatrix} \quad (39)$$

The matrix coefficients of Equation 39 depend on $\theta_r$, $\phi_r$, and three trajectory measurements: deviation, azimuth and rotation.

The components of the vector in the right hand side of Equation 39 represent all non-zero field components generated by three orthogonal induction transmitters in the coordinate system associated with the formation. Only two of them depend on vertical resistivity: $h_{xx}$ and $h_{yy}$. This allows us to build a linear combination of measurements, $h_{11}$, $h_{22}$, and $h_{33}$ in such a way that the resulting transformation depends only on $h_{zz}$ and $h_{xz}$, or, in other words, only on horizontal resistivity. Let T be the transformation with coefficients $\alpha$, $\beta$ and $\gamma$:

$$T=\alpha MFF(h_{11})+\beta MFF(h_{22})+\gamma MFF(h_{33}) \tag{40}$$

The coefficients $\alpha$, $\beta$ and $\gamma$ must satisfy the following system of equations:

$$a_1\alpha+b_1\beta+c_1\gamma=0$$
$$a_2\alpha+b_2\beta+c_2\gamma=0 \tag{41}$$
$$\alpha^2+\beta^2+\gamma^2=1$$

From the above discussion it follows that a transformation may be developed that is independent of the formation azimuth. The formation azimuth-independent transformation may be expressed as:

$$T_0=(h_{11}+h_{22})\sin^2\theta-h_{33}(1+\cos^2\theta) \tag{42}$$

where $\theta$ is the dip of the formation and $T_0$ is the linear transformation to separate modes. With this transformation and the above series of equations we may determine the conductivity of the transversely anisotropic formation.

It is to be noted, however, that when the earth formation is uniform (i.e., there are no formation boundaries within the region of investigation of the tool), it is not possible to satisfy eq. (40). It is necessary then to have a measurement of at least one cross-component.

The present invention has been discussed above with respect to measurements made by a transverse induction-logging tool conveyed on a wireline. This is not intended to be a limitation and the method is equally applicable to measurements made using a comparable tool conveyed on a measurement-while-drilling (MWD) assembly or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of lagging a subsurface formation comprising a plurality a layers each having a horizontal conductivity and a vertical conductivity, the method comprising:
    (a) conveying an electromagnetic logging tool into a borehole in the subsurface formation, said logging tool including a plurality of transmitters and a plurality of receivers, at least one of said transmitters and at least one of said receivers inclined to an axis of the tool, said borehole having an axis inclined at a nonzero angle to a normal to said layers;
    (b) using said electromagnetic logging tool for obtaining a plurality of measurements with a plurality of pairs of said transmitters and receivers;
    (c) using a first subset of said plurality of measurements for determining a horizontal conductivity associated with each of said layers; and
    (d) using determined horizontal conductivities and a second subset of said plurality of measurements for determining a vertical conductivity associated with each of said layers.

2. The method of claim 1 wherein said plurality of transmitters comprise x-, y- and z-transmitters and the plurality of receivers comprise x-, y- and z-receivers.

3. The method of claim 2 wherein said first subset of measurements consist of principal component measurements.

4. The method of claim 2 wherein determining the horizontal conductivity and the vertical conductivity associated with each of the plurality of layers further comprises obtaining a tool rotation angle, formation azimuth, and an angle of inclination of said borehole to the normal to the plurality of layers.

5. The method of claim 2 wherein said subsurface formation further comprises a uniform formation, and the plurality of measurements further comprises at least one measurement selected from (i) a $h_{xz}$ measurement, (ii) a $h_{xy}$ measurement, (iii) a $h_{zx}$ measurement, (iv) a $h_{zy}$ measurement, (v) a $h_{yx}$ measurement, and, (vi) a $h_{yz}$ measurement.

6. The method of claim 1 wherein determining the horizontal conductivity associated with each of said layers further comprises applying frequency focusing to said first subset of measurements and obtaining therefrom a first frequency focused set of measurements.

7. The method of claim 2 wherein determining the horizontal conductivity associated with each of said layers further comprises applying frequency focusing to said first subset of measurements and obtaining therefrom a second frequency focused set of measurements.

8. The method of claim 7 wherein determining the horizontal conductivity associated with each of said layers further comprises determining a set of weights such that a weighted sum of the first frequency focused set of measurements is substantially independent of the vertical conductivity associated with each of the plurality of layers.

9. The method of claim 8 wherein determining the vertical conductivity associated with each of said layers further comprises inverting the second frequency focused set of measurements using a model including said horizontal and a vertical conductivity associated with each of said plurality of layers.

10. The method of claim 6 wherein determining the horizontal conductivity associated with each of said layers further comprises determining a set of weights such that a weighted sum of the first frequency focused set of measurements is substantially independent of the vertical conductivity associated with each of the plurality of layers.

11. The method of claim 10 wherein determining the vertical conductivity associated with each of said layers further comprises inverting the second frequency focused set of measurements using a model including said horizontal and a vertical conductivity associated with each of said plurality of layers.

12. The method of claim 1 wherein determining the horizontal conductivity and the vertical conductivity associated with each of the plurality of layers further comprises obtaining a tool rotation angle, formation azimuth, and an angle of inclination of said borehole to the normal to the plurality of layers.

13. The method of claim 1 further comprising repeating (c)–(d) and iteratively updating an estimate of said non zero angle until a difference between said measurements and a model output obtained using said horizontal and vertical conductivities is less than a predetermined threshold.

14. The method of claim 1 wherein determining said horizontal conductivity associated with each of said layers further comprises performing an inversion.

* * * * *